United States Patent
Li et al.

(10) Patent No.: US 12,094,155 B2
(45) Date of Patent: Sep. 17, 2024

(54) SHOOTING SCORE IDENTIFYING METHOD AND DEVICE, AND ELECTRONIC DEVICE

(71) Applicant: Huntercraft Limited, Albany, NY (US)

(72) Inventors: Danyang Li, Albany, NY (US); Xu Wang, Albany, NY (US)

(73) Assignee: Huntercraft Limited, Albany, NY (US)

( * ) Notice: Subject to any disclaimer, the term of this patent is extended or adjusted under 35 U.S.C. 154(b) by 223 days.

(21) Appl. No.: 17/807,325

(22) Filed: Jun. 16, 2022

(65) Prior Publication Data

US 2023/0267638 A1    Aug. 24, 2023

(30) Foreign Application Priority Data

Feb. 23, 2022   (CN) .................. 202210169707.X
Feb. 23, 2022   (CN) .................. 202220378054.1

(51) Int. Cl.
*G06T 7/70* (2017.01)
*F41J 5/08* (2006.01)
*F41J 5/10* (2006.01)
*F41J 5/14* (2006.01)
*G02B 13/14* (2006.01)
(Continued)

(52) U.S. Cl.
CPC ................... *G06T 7/70* (2017.01);
*F41J 5/08* (2013.01); *F41J 5/10* (2013.01);
*G02B 13/14* (2013.01); *G06T 7/13* (2017.01);
*G06T 7/66* (2017.01); *G06V 10/147* (2022.01);
*G06V 10/225* (2022.01); *G06V 10/245*
(2022.01); *G06V 10/36* (2022.01); *F41J 5/14*
(2013.01); *G06T 2207/10048* (2013.01); *G06T 2207/20132* (2013.01); *G06T 2207/30204*
(2013.01);
(Continued)

(58) Field of Classification Search
CPC . F41J 5/02; F41J 5/08; F41J 5/10; F41J 5/12; F41J 5/14; F41J 5/20; F41J 5/24; F41J 5/26; G06V 2201/07
See application file for complete search history.

(56) References Cited

U.S. PATENT DOCUMENTS

2005/0171689 A1* 8/2005 Malmberg ................. F41J 5/08
701/408
2016/0180532 A1* 6/2016 Katramados .............. G06T 7/73
382/103

(Continued)

FOREIGN PATENT DOCUMENTS

CN                109974531 A  *  7/2019

*Primary Examiner* — Vincent Rudolph
*Assistant Examiner* — Raphael Schwartz
(74) *Attorney, Agent, or Firm* — NKL Law; Allen Xue

(57) ABSTRACT

A shooting score identifying method and device, and an electronic device are provided. The method includes the steps of capturing a picture of a shooting operation on target paper to acquire a shooting image formed on the target paper; forming a thermal imaging image of the target paper after the shooting image is acquired; performing target identification on the shooting image to obtain a target image related to a shooting point, and performing direction correction on the shooting point present in the target image to obtain a correction image; and performing interference removal processing on the correction image through the thermal imaging image to obtain an identification image, thereby identifying a shooting score based on the identification image.

13 Claims, 5 Drawing Sheets

(51) Int. Cl.
    *G06T 7/13*      (2017.01)
    *G06T 7/66*      (2017.01)
    *G06V 10/147*    (2022.01)
    *G06V 10/22*     (2022.01)
    *G06V 10/24*     (2022.01)
    *G06V 10/36*     (2022.01)
    *H04N 23/11*     (2023.01)

(52) U.S. Cl.
    CPC .................. *G06T 2207/30242* (2013.01);
            *G06V 2201/07* (2022.01); *H04N 23/11*
                                            (2023.01)

(56)  References Cited

U.S. PATENT DOCUMENTS

2019/0063884 A1* 2/2019 McBride .................... F41J 5/10
2023/0011950 A1* 1/2023 Feng ...................... H04N 23/64

\* cited by examiner

SHOOTING SCORE IDENTIFYING METHOD AND DEVICE, AND ELECTRONIC DEVICE

FIELD

The present disclosure relates to the technical field of data processing, in particular to a shooting score identifying method and device, and an electronic device.

Background

As a shooting sport, target shooting is a common sport form. The target shooting refers to target-aligned shooting and shooting on a set target according to a certain rule so as to test the shooting training effect and improve the shooting skill. Shooting can be interpreted as firearm firing or a shooting sport. The firearm firing is a process that a shooter uses a firearm to precisely fire and hit the set target. The shooting sport is a competitive event that a firearm aims at a target to shoot.

In a target shooting training process, a target shooting system is essential. For the target shooting system, as the science and technology continuously develops and progresses, the target shooting system is continuously updated: an initial target shooting system is to score manually, a target position is set, a score reporter observe the target to report the score, and thus, such a traditional score reporting system has multiple drawbacks such as large error, high accident rate and high fraud probability.

With the rapid development of social economy, the application field of computers becomes more extensive. The application of the computers brings immeasurable benefits to many fields. In recent years, on the basis of the computers, many improvements are brought to the target shooting system.

Summary

Therefore, the present disclosure provides a shooting score identifying method and device, and an electronic device so as to at least partially solve the problems in the prior art.

In a first aspect, an embodiment of the present disclosure provides a shooting score identifying method, including:
  capturing a picture of a shooting operation on target paper through an optical lens arranged in front of the target paper to acquire a shooting image formed on the target paper;
  forming a thermal imaging image of the target paper through an infrared lens arranged at the same position as the optical lens after the shooting image is acquired;
  performing target identification on the shooting image to obtain a target image related to a shooting point, and performing direction correction on the shooting point present in the target image to obtain a correction image; and
  performing interference removal processing on the correction image through the thermal imaging image to obtain an identification image, thereby identifying a shooting score based on the identification image.

According to a specific implementation mode of the embodiment of the present disclosure, capturing the picture of the shooting operation on the target paper through the optical lens arranged in front of the target paper to acquire the shooting image formed on the target paper includes:
  aligning a shooting field of view of the optical lens with the target paper;
  capturing a target paper image formed by the target paper in the optical lens in real time; and
  performing target identification on the target paper image, and performing picture shooting on the target paper image with the presence of a shooting trace to form the shooting image when the presence of the shooting trace in the target paper image is found by means of the target identification.

According to a specific implementation mode of the embodiment of the present disclosure, forming the thermal imaging image of the target paper through the infrared lens arranged at the same position as the optical lens includes:
  detecting whether the shooting image is generated in the optical lens; and
  if so, calling the infrared lens to perform photographing operation on the target paper so as to form the thermal imaging image.

According to a specific implementation mode of the embodiment of the present disclosure, performing the target identification on the shooting image to obtain the target image related to the shooting point includes:
  performing region identification on a region of the shooting image in which the shooting point is present to obtain a target region;
  cropping the shooting image with the target region as a range; and
  taking the cropped image as the target image.

According to a specific implementation mode of the embodiment of the present disclosure, performing interference removal processing on the correction image through the thermal imaging image includes:
  performing an alignment operation on the thermal imaging image and the correction image; and
  performing image filtering processing on the correction image based on an image content formed in the thermal imaging image after the alignment operation is completed.

According to a specific implementation mode of the embodiment of the present disclosure, performing direction correction on the shooting point present in the target image to obtain the correction image includes:
  identifying a shooting angle formed by the shooting point in the target image to obtain a shooting direction;
  judging whether the shooting direction is greater than a preset angle; and
  if so, performing direction correction on the shooting point.

According to a specific implementation mode of the embodiment of the present disclosure, the target paper includes a bottom layer, a middle layer and a surface layer; and
  the bottom layer comprises a solid raw material, the middle layer comprises a water film layer, and the surface layer is provided with target ring information, positioning information and a target paper identification code.

According to a specific implementation mode of the embodiment of the present disclosure, the content of performing direction correction on the shooting point present in the target image to obtain the correction image includes:
  selecting a plurality of reference points in the target paper in advance, and performing image acquisition on the target paper by adopting a standard optical lens according to a standard distance and a standard angle to obtain coordinates of the reference points in a standard image as standard reference point coordinates;

determining offset reference point coordinates between the reference point coordinates and standard reference point coordinates in a to-be-corrected target image by pixel scanning;

calculating a space coordinate transformation coefficient between the standard image and the to-be-corrected target image according to the offset reference point coordinates; and performing transformation on all or part of pixels in the to-be-corrected target image according to the space coordinate transformation coefficient to realize correction.

According to a specific implementation mode of the embodiment of the present disclosure, the standard distance is a standard shooting distance; and the standard angle is that the optical lens directly faces the target paper.

According to a specific implementation mode of the embodiment of the present disclosure, the space coordinate transformation coefficient is a quadratic polynomial coefficient.

According to a specific implementation mode of the embodiment of the present disclosure, the quantity of the reference points is 6 or more.

According to a specific implementation mode of the embodiment of the present disclosure, the content of identifying the shooting score based on the identification image includes:

bullet hole center detection: extracting bullet hole information by using a ternary image;

score center detection: extracting center coordinates of a highest score region in the target paper; and score calculation: calculating a shooting score according to a position relationship between the bullet hole information and the center coordinates.

According to a specific implementation mode of the embodiment of the present disclosure, the content of extracting the bullet hole information by using the ternary image includes: performing double opening operations on the ternary image to remove interference, and then obtaining a coordinate value of a bullet hole center by using a method of calculating the center of gravity of an object.

According to a specific implementation mode of the embodiment of the present disclosure, the content of extracting coordinates of a center point of each score region includes:

S1, performing opening operation and closing operation on the image to obtain a binary target surface image;

S2, performing region marking on the binary target surface image to obtain a highest score region;

S3, performing edge detection on the highest score region to obtain region edge data; and S4, calculating to obtain center coordinates of the region according to the region edge data.

According to a specific implementation mode of the embodiment of the present disclosure, the step S2 specifically includes: performing region marking by adopting a connected region method to obtain a plurality of marked connected regions;

counting areas of the plurality of marked connected regions in a form of pixel number, wherein a plurality of connected regions with the minimum number of pixels are the highest score regions of the target paper.

In a second aspect, an embodiment of the present disclosure provides a shooting score identifying device, including:

an acquisition module, used for acquiring a shooting image formed on a target paper by capturing a picture of a shooting operation on the target paper through an optical lens arranged in front of the target paper;

a formation module, used for forming a thermal imaging image of the target paper through an infrared lens arranged at the same position as the optical lens after the shooting image is acquired;

a correction module, used for performing target identification on the shooting image to obtain a target image related to a shooting point, and performing direction correction on the shooting point present in the target image to obtain a correction image; and an identification module, used for performing interference removal processing on the correction image through the thermal imaging image to obtain an identification image, so as to identify a shooting score based on the identification image.

In a third aspect, an embodiment of the present disclosure further provides an electronic device, including:

at least one processor; and a memory in communication connection with the at least one processor; wherein the memory stores an instruction which can be executed by the at least one processor, and the instruction is executed by the at least one processor, so that the at least one processor can execute the shooting score identifying method in the aforesaid first aspect or any one of the implementation modes in the first aspect.

In a fourth aspect, an embodiment of the present disclosure further provides a non-transient computer readable storage medium, wherein the non-transient computer readable storage medium stores computer instructions which are used for enabling a computer to execute the shooting score identifying method in the aforesaid first aspect or any one of the implementation modes in the first aspect.

In a fifth aspect, an embodiment of the present disclosure also provides a computer program product that includes a computer program stored on a non-transient computer readable storage medium, wherein the computer program includes program instructions that, when executed by a computer, enable the computer to execute the shooting score identifying method in the aforesaid first aspect or any one of the implementation modes in the first aspect.

The shooting score identifying solution in the embodiments of the present disclosure include: acquiring a shooting image formed on a target paper by capturing a picture of a shooting operation on the target paper through an optical lens arranged in front of the target paper; forming the thermal imaging image of the target paper through the infrared lens arranged at the same position as the optical lens after the shooting image is obtained; performing target identification on the shooting image to obtain the target image related to the shooting point, and performing direction correction on the shooting point present in the target image to obtain the correction image; and performing interference removal processing on the correction image through the thermal imaging image to obtain the identification image, thereby identifying the shooting score based on the identification image. Through the processing solution disclosed by the present disclosure, the shooting score identifying efficiency is improved.

BRIEF DESCRIPTION OF THE DRAWINGS

In order to more clearly illustrate the technical solutions of the embodiments of the present disclosure, the accompanying drawings required to be used in the embodiments are simply introduced below. Obviously, the accompanying drawings in the description below are only some embodiments of the present disclosure, and those of ordinary skill in the art can obtain other drawings according to these accompanying drawings without inventive efforts.

DETAILED DESCRIPTION OF THE EMBODIMENTS

Figure 1:
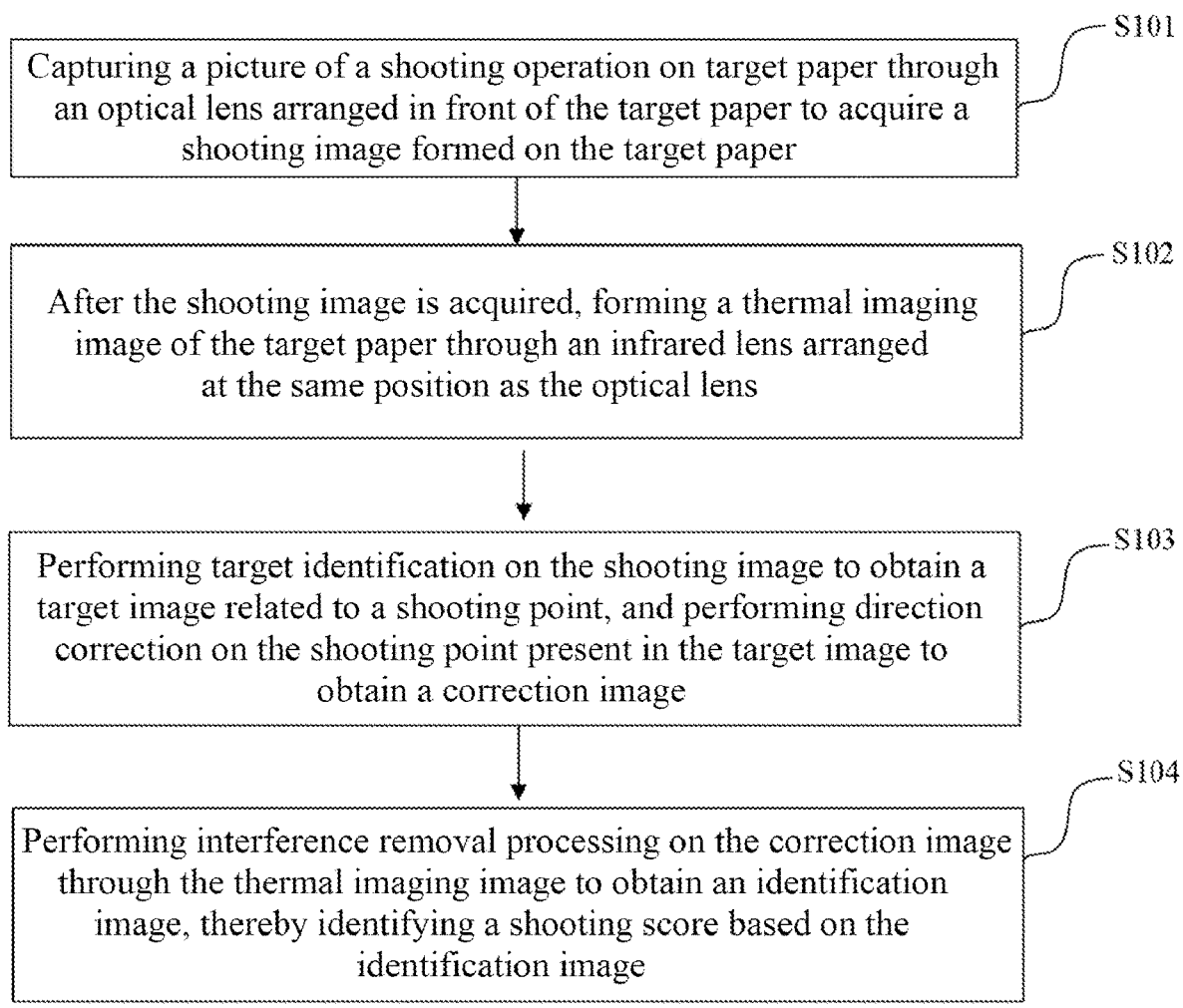
FIG. 1 is a flow chart of the shooting score identifying method provided by an embodiment of the present disclosure.

The embodiments of the present disclosure are described in detail in combination with the accompanying drawings.

Implementation modes of the present disclosure are illustrated by specific instances below, and those skilled in the art can easily understand other advantages and effects of the present disclosure according to the content disclosed in the specification. Obviously, the described embodiments are only a part of embodiments of the present disclosure, but not all embodiments of the present disclosure. The present disclosure can also be implemented or applied through other different specific implementation modes, and various details in this specification can also be modified or changed based on different viewpoints and applications without departing from the spirit of the present disclosure. It should be noted that the following embodiments and features in the embodiments may be combined with each other under the condition of no conflict. Based on the embodiments in the present disclosure, all other embodiments obtained by those of ordinary skill in the art without inventive efforts fall within the scope of protection of the present disclosure.

It should be noted that various aspects of the embodiments within the scope of the appended claims are described below. Apparently, the aspects described herein can be embodied in a wide variety of forms, and any particular structures and/or functions described herein are only illustrative. Based on the present disclosure, those skilled in the art should know that one aspect described herein may be implemented independently of any other aspect, and two or more of these aspects may be combined in various ways. For example, any number of aspects set forth herein may be used to implement devices and/or practice methods. In addition, other structures and/or functionalities other than one or more of the aspects set forth herein may be used to implement the devices and/or practice the methods.

It should be noted that the drawings provided in the following embodiments illustrate the basic idea of the present disclosure by way of an illustrative mode only, only the components related to the present disclosure are displayed in the drawings instead of being drawn according to the quantity, the shape and the size of the components in the actual implementation process, the form, the quantity and the proportion of the components in the actual implementation process can be changed optionally, and the layout form of the components can be more complicated.

In addition, in the following description, specific details are provided to facilitate thorough understanding of the instances. However, those skilled in the art will understand that the aspects can be implemented without these specific details.

An embodiment of the present disclosure provides a shooting score identifying method. The shooting score identifying method provided by the embodiment of the present disclosure can be executed by a computing device, the computing device can be implemented as software or a combination of software and hardware, and the computing device can be integrally arranged in a server, a client or the like.

As shown in FIG. 1, the shooting score identifying method in the embodiment of the present disclosure may include the following steps.

S101, a picture of a shooting operation on target paper is captured through an optical lens arranged in front of the target paper to acquire a shooting image formed on the target paper.

In order to acquire the shooting image in real time, the optical lens for collecting the shooting image is arranged in front of the target paper, and the shooting image is captured through the optical lens.

As a mode, the image on the target paper can be captured by monitoring whether a shooting trace is present in the image in the optical lens in real time, and when it is found that the shooting trace is present in the image in the optical lens, the shooting image can be captured through the optical lens.

S102, after the shooting image is acquired, a thermal imaging image of the target paper is formed through an infrared lens arranged at the same position as the optical lens.

In addition to the arrangement of the optical lens, the infrared lens is further arranged at the position of the optical lens, and an infrared image formed by the target paper can be filtered through the infrared lens, so that the interference of infrared light on the shooting image can be filtered.

S103, target identification is performed on the shooting image to obtain a target image related to a shooting point, and direction correction is performed on the shooting point present in the target image to obtain a correction image.

In order to further reduce the area of the image needing to be identified, target identification can be further performed on the shooting image, so that the shooting trace present in the shooting image is identified, and further the target image containing all shooting points is obtained.

After the target image is obtained, direction correction can be further performed on the shooting point present on the target image, the position of the shooting point can be described more accurately through direction correction, and therefore support is provided for obtaining a final shooting score.

The direction correction mainly refers to space coordinate transformation, namely, pixels on an image plane are rearranged to restore an original space relation. In the embodiment, firstly, coordinates of reference points selected from the target paper are measured to serve as standard reference point coordinates; and according to the method, offset reference point coordinates corresponding to the standard reference point coordinates are determined on a target paper image acquired by an actual optical lens by pixel scanning, and a space coordinate transformation coefficient, i.e., a geometric correction coordinate transformation matrix, is calculated through corresponding coordinate pairs. Space coordinate transformation can be performed on the shooting image acquired by the optical lens by utilizing the coordinate transformation matrix to obtain a corrected shooting image.

It is assumed that a real image, namely an image before distortion, is set as f(x, y), and an image acquired by the optical lens, namely an image after distortion, is set as g(u, v), wherein (x, y) and (u, v) respectively represent coordinates of pixel points at the same position in the image before and after distortion, due to distortion, the two groups of coordinates are not equal any more, and the two groups of coordinates can be transformed by nonlinear transformation, that is:

$$(x,y)=T[(u,v)]$$

an expression in a polynomial form is:

$$\begin{cases} x = \sum_{i=0}^{n}\sum_{j=0}^{n-i} a_{ij} u^i v^j \\ y = \sum_{i=0}^{n}\sum_{j=0}^{n-i} b_{ij} u^i v^j \end{cases},$$

wherein $a_{ij}$ and $b_{ij}$ are undetermined coefficients, and n is the degree of the polynomial. A coefficient of the polynomial is fitted by utilizing the known coordinates of reference point pairs, and the obtained polynomial is used for restoring other distortion points. The correction accuracy is related to the degree of the adopted correction polynomial, and the higher the degree of the polynomial is, the more accurate the correction is. However, as the degree of the polynomial increases, the number of the coefficients is correspondingly increased, resulting in a sharp increase of calculated amount. When n=1, the calculated amount is small, but only linear distortion can be corrected; and when n=2, most of geometric distortions can be corrected, and the requirements on the direction correction of the distorted shooting image in the present disclosure can be met, so that the quadratic polynomial is selected to correct the shooting image with geometric distortion. The quadratic polynomial for space coordinate transformation is expressed to be:

$$\begin{cases} x = a_{00} + a_{10}u + a_{01}v + a_{11}uv + a_{20}u^2 + a_{02}v^2 \\ y = b_{00} + b_{10}u + b_{01}v + b_{11}uv + b_{20}u^2 + b_{02}v^2 \end{cases}.$$

When the coordinates of the reference point pairs are used for fitting the polynomial, the sum of squares of fitting errors of an x-axis and a y-axis is expressed to be:

$$\begin{cases} \varepsilon_x = \sum_{k=1}^{L}\left(X_k - \sum_{i=0}^{2}\sum_{j=0}^{2-i} a_{ij} u^i v^j\right)^2 \\ \varepsilon_y = \sum_{k=1}^{L}\left(y_k - \sum_{i=0}^{2}\sum_{j=0}^{2-i} b_{ij} u^i v^j\right)^2 \end{cases}.$$

The sum of squares of fitting errors in the above formula should be minimum, namely $\varepsilon_x$ and $\varepsilon_y$ in the formula are minimum. L is the quantity of the reference point pairs.

When $\varepsilon_x$ and $\varepsilon_y$ are minimum, a partial differential equation is 0, that is:

$$\begin{cases} \frac{\partial \varepsilon_x}{\partial a_{nm}} = 2\sum_{k=1}^{L}\left(\sum_{i=0}^{2}\sum_{j=0}^{2-i} a_{ij} u_k^i v_k^j - x_k\right) u_k^n v_k^m = 0 \\ \frac{\partial \varepsilon_y}{\partial b_{nm}} = 2\sum_{k=1}^{L}\left(\sum_{i=0}^{2}\sum_{j=0}^{2-i} b_{ij} u_k^i v_k^j - y_k\right) u_k^n v_k^m = 0 \end{cases},$$

wherein n=0, 1, 2; m=0, 1, 2–n. Further, there may be:

$$\begin{cases} \sum_{i=0}^{2}\sum_{j=0}^{2-i} a_{ij} \left(\sum_{k=1}^{L} u_k^{i+n} v_k^{j+m}\right) = \sum_{k=1}^{L} x_k u_k^n v_k^m \\ \sum_{i=0}^{2}\sum_{j=0}^{2-i} b_{ij} \left(\sum_{k=1}^{L} u_k^{i+n} v_k^{j+m}\right) = \sum_{k=1}^{L} y_k u_k^n v_k^m \end{cases}$$

The formula can be expressed in a matrix mode:

$$\begin{cases} X = TA \\ Y = TB \end{cases} \quad (1)$$

wherein:

$$T = \begin{bmatrix} \sum_{k=1}^{L} 1 & \sum_{k=1}^{L} v_k & \sum_{k=1}^{L} v_k^2 & \sum_{k=1}^{L} u_k & \sum_{k=1}^{L} u_k v_k & \sum_{k=1}^{L} u_k^2 \\ \sum_{k=1}^{L} v_k & \sum_{k=1}^{L} v_k^2 & \sum_{k=1}^{L} v_k^3 & \sum_{k=1}^{L} u_k v_k & \sum_{k=1}^{L} u_k v_k^2 & \sum_{k=1}^{L} u_k^2 v_k \\ \sum_{k=1}^{L} v_k^2 & \sum_{k=1}^{L} v_k^3 & \sum_{k=1}^{L} v_k^4 & \sum_{k=1}^{L} u_k v_k^2 & \sum_{k=1}^{L} u_k v_k^3 & \sum_{k=1}^{L} u_k^2 v_k^2 \\ \sum_{k=1}^{L} u_k & \sum_{k=1}^{L} u_k v_k & \sum_{k=1}^{L} u_k v_k^2 & \sum_{k=1}^{L} u_k^2 & \sum_{k=1}^{L} u_k^2 v_k & \sum_{k=1}^{L} u_k^3 \\ \sum_{k=1}^{L} u_k v_k & \sum_{k=1}^{L} u_k v_k^2 & \sum_{k=1}^{L} u_k v_k^3 & \sum_{k=1}^{L} u_k^2 v_k & \sum_{k=1}^{L} u_k^2 v_k^2 & \sum_{k=1}^{L} u_k^3 v_k \\ \sum_{k=1}^{L} u_k^2 & \sum_{k=1}^{L} u_k^2 v_k & \sum_{k=1}^{L} u_k^2 v_k^2 & \sum_{k=1}^{L} u_k^3 & \sum_{k=1}^{L} u_k^3 v_k & \sum_{k=1}^{L} u_k^4 \end{bmatrix}.$$

Correction coefficient matrixes A and B are expressed to be:

$$A = [a_{00} a_{01} a_{02} a_{10} a_{11} a_{20}]^T$$

$$B = [b_{00} b_{01} b_{02} b_{10} b_{11} b_{20}]^T.$$

T, X and Y can be calculated according to the coordinates of the reference point pairs. According to the operational rule of the matrix, the following formula can be obtained:

$$\begin{cases} A = T^{-1} X \\ B = T^{-1} Y \end{cases}.$$

The quadratic polynomial in the embodiment has 12 unknown numbers, so that at least 6 reference points need to be selected. The reference points are selected from positions of edge points, corner points and inflection points, which have obvious features or large gray scale differences. In the embodiment, a reference point selection method includes the following steps: linear scanning is performed on actual target paper, namely a binary image of an image before distortion and an optical imaging target paper image, namely a binary image of an image after distortion, a straight line with the slope being −1 is used to scan upwards from the lower left corner of each image, then a first pixel point tangent to the target paper is a reference point 2, and the last pixel point intersected with the target paper is a reference point 6; a straight line with the slope being 1 is used to scan upwards from the lower right corner of each image, then a first pixel point tangent to the target paper is a reference point 1, and the last pixel point intersected with the target paper is a reference point 3; a straight line with the slope being 0.75 is used to scan downwards from the upper left corner of each image, and a first pixel point tangent to the target paper is a reference point 4; and a straight line with the slope being −0.75 is used to scan downwards from the upper right corner of each image, and a first pixel point tangent to the target paper is a reference point 5. Therefore, 6 reference point coordinates, namely 6 groups of reference coordinate pairs, in the actual target paper image and the optical imaging image are obtained. The coordinates of the reference points in the image before distortion and the image after distortion are substituted into the matrix T and the formula 1, the correction coefficient matrixes A and B are solved by means of solving the inverse of a matrix, and further the shooting image obtained by optical imaging is corrected into a standard image so as to complete the direction correction on the shooting image. S104, interference removal processing is performed on the correction image through the thermal imaging image to obtain an identification image, thereby identifying a shooting score based on the identification image.

In order to perform image identification more accurately, interference processing can be performed on the obtained thermal imaging image and the correction image, for example, interferents present on the correction image can be judged through the thermal imaging image, and interference processing can be further performed on the correction image by deleting the interferents on the correction image, so that the identification image is obtained.

The final score of a user on the target paper can be obtained by performing image identification on the shooting point present on the identification image.

The method for performing image identification on the shooting point present on the identification image includes: bullet hole center detection and score center detection.

The bullet hole center detection refers to extracting bullet hole information by using a ternary image. The ternary image refers to that when the collected image has 256-level gray scale, the gray scale of the image is generally reduced in order to reduce the storage space for the image and facilitate programming in the processing process. In the embodiment of the present disclosure, the information content of the collected image mainly includes a gray background, a black target region and a gray bullet hole. In the image processing process, three gray values are used to perform ternary processing on the above three regions, so that the requirements can be met if the gray scale of the image is reduced to be in three level. In the subsequent image processing process, the image is further separated into two binary images. The gray scale of the part of the bullet hole in the image is set to be black, and the gray scales of the other parts are set to be white. In other words, the white part in the ternary image is set to be black, and the other parts are set to be white. In this way, in addition to the bullet trace, the processed identification image also has the fine contour lines of the target region, which is caused by the fact that the gray scale of the bullet hole is located between the gray scale of the black target region and the gray scale of the greyish white background. Therefore, a bullet hole-like gray scale also appears in a transition region of the greyish white background and the black target region. These fine contour lines are not needed. Since the pixel widths of the lines are smaller than the width of the bullet hole, the image can be subjected to double opening operations to remove the interferences. For the image subjected to the double opening operations, a center coordinate value $[x_i, y_i]$ of the bullet hole is obtained by utilizing a method for solving the center of gravity of an object.

The score center detection refers to extracting a center coordinate value of a highest score region in the target paper. In practical application, the shooting target paper has various forms, for example, the most common silhouette target of which the central region is a 10-ring highest score region. For a human silhouette shooting target, the head part and the heart part can be set as the highest score regions. According to score center detection in the embodiment, the highest score regions of different target paper can be detected, and the corresponding shooting scores of the highest score regions can be calculated. The score center detection includes the following specific steps:

Firstly, a structural unit P is used for performing opening operation on the identification image, and performing closing operation of expansion and corrosion on the result produced by the opening operation.

Then, a binary target surface image obtained through the opening operation and the closing operation includes a background region and a highest score region, and in order to obtain center coordinates of the highest score region, the highest score region is obtained by means of region marking. In order to mark the highest score region, the embodiment adopts a method for calculating areas by connected regions. The purpose of marking the connected regions is to mark a unique mark value. Firstly, an input binary target paper identification image subjected to the opening and closing operations is traversed according to a row sequence, a first point al of an unmarked region is found to be marked; and whether eight neighborhoods of the marked point al meet connectivity requirements is checked, and unmarked points meeting connectivity in the neighborhoods are recorded as new marked points which serve as new seed points for "region growth". The above steps are repeated until no new seed point appear, and thus, the marking for one connected region ends. Then a next unmarked region is marked until pixel points of the whole target paper identification image are all traversed. A plurality of marked connected regions can be obtained from the output image. The areas of the plurality of marked connected regions are counted according to the number of pixel points. For the silhouette target, the connected region with the minimum number of pixels is the highest score region, and for the human silhouette shooting target, the two connected regions with the minimum number of pixels are the highest score regions.

Edge detection is performed on the highest score region, and if a quadratic function of an edge line of the highest score region is:

$$f(x,y),$$

when the highest score region is a circle, the score center point $(x_0, y_0)$ of the highest score region is:

$$R^2=(x-x_0)^2+(y-y_0)^2$$

wherein R is the radius of the highest score region;
the error between a coordinates $(x_i, y_i)$ of a midpoint in the quadratic function of the edge line of the highest score region and the point of the corresponding least-squares circle is expressed to be:

$$\Delta R_i = x_i^2 + y_i^2 - 2x_0 x_i - 2y_0 y_i + (x_0^2 + y_0^2 - R^2)$$

According to the definition of a least square method, the sum of squares of errors of various points on the edge line of the highest score region is expressed to be:

$$\delta = \sum_{i=1}^{n} (\Delta R_i)^2 = \sum_{i=1}^{n} x_i^2 + y_i^2 - 2x_0 x_i - 2y_0 y_i + (x_0^2 + y_0^2 - R^2).$$

When the sum of squares is minimum, there is:

$$d\delta = \frac{\partial \delta}{\partial x_0} dx_0 + \frac{\partial \delta}{\partial y_0} dy_0 + \frac{\partial \delta}{\partial (x_0^2 + y_0^2 - R^2)} d(x_0^2 + y_0^2 - R^2) = 0,$$

that is:

$$\begin{cases} \sum_{i=1}^{n} (x_i^3 + y_i^2 x_i - 2x_0 x_i^2 - 2y_0 x_i y_i + (x_0^2 + y_0^2 - R^2)) = 0 \\ \sum_{i=1}^{n} (x_i^2 y_i + y_i^3 - 2x_0 x_i y_i - 2x_0 y_i^2 + (x_0^2 + y_0^2 - R^2) y_i) = 0 \\ \sum_{i=1}^{n} (x_i^2 + y_i^2 - 2x_0 x_i - 2y_0 y_i + (x_0^2 + y_0^2 - R^2)) = 0 \end{cases},$$

$x_0$, $y_0$, and R can be obtained by solving the above equation.

After bullet hole center detection and score center detection of the target paper identification image are completed, statistical calculation is performed on the shooting score. In the embodiment of the present disclosure, the shooting score is calculated by taking the distance from the coordinate position of the bullet hole to the score center as a standard, and for the silhouette target, the calculation formula of the shooting score Q is:

$$Q = \sum_{i=1}^{K} \left( 10 - \left[ \frac{\sqrt{(x_i - x_0)^2 + (y_i - y_0)^2} - R}{t} \right] \right)$$

wherein $x_0$ and $y_0$ are the coordinates of the score center point of the highest score region, R is the radius of the highest score region, $x_i$ and $y_i$ are coordinates of an ith bullet hole, K is the quantity of the bullet holes, and t is a ring distance.

For the human silhouette shooting target with two highest score regions, the calculation formula of the shooting score Q is:

$$Q = \sum_{i=1}^{K} \max\{Q_{(i,1)}, Q_{(i,2)}\};$$

$$Q_{(i,1)} = 10 - \left[ \frac{\sqrt{(x_i - x_{(0,1)})^2 + (y_i - y_{(0,1)})^2} - R_1}{t} \right];$$

$$Q_{(i,2)} = 10 - \left[ \frac{\sqrt{(x_i - x_{(0,2)})^2 + (y_i - y_{(0,2)})^2} - R_2}{t} \right];$$

wherein $Q_{(i,1)}$ is a score value of the ith bullet hole relative to the first highest score region, and $Q_{(i,2)}$ is a score value of the ith bullet hole relative to the second highest score region; $x_{(i,1)}$ and $y_{(i,1)}$ are coordinates of the score center point of the first highest score area, $R_1$ is the radius of the first highest score area, $x_{(i,2)}$ and $y_{(i,2)}$ are coordinates of the score center point of the second highest score area, $R_2$ is the radius of the second highest score area, $x_i$ and $y_i$ are coordinates of the ith bullet hole, K is the quantity of the bullet holes, and t is the ring distance.

Figure 2:
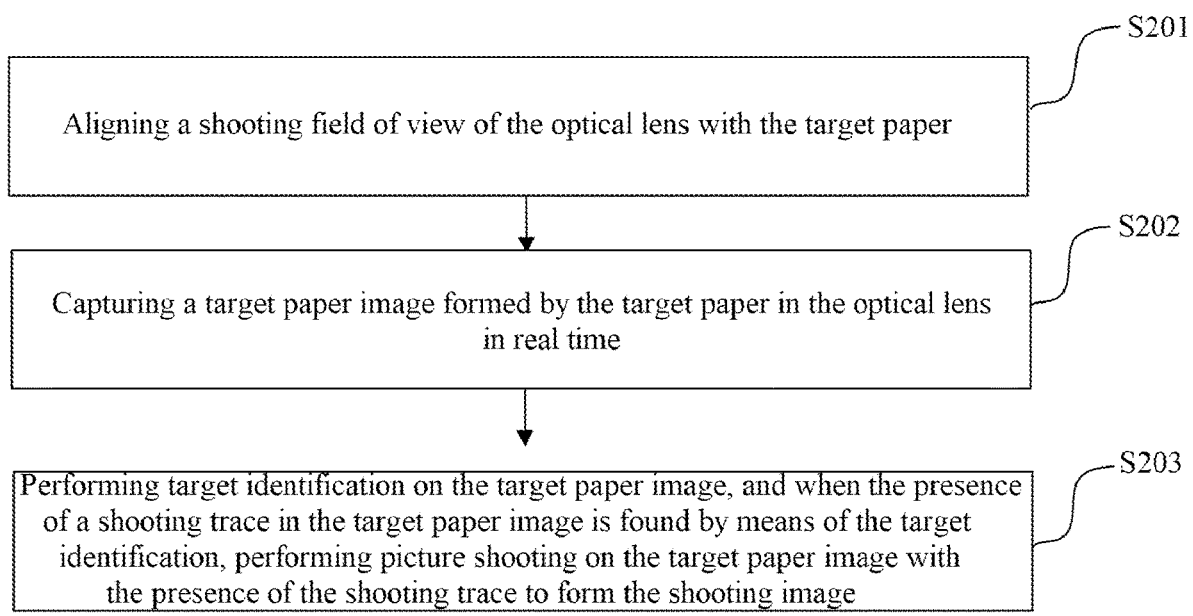
FIG. 2 is a flow chart of another shooting score identifying method provided by an embodiment of the present disclosure.

Referring to FIG. 2, according to a specific implementation mode of the embodiment of the present disclosure, the step that the picture of the shooting operation on the target paper is captured through the optical lens arranged in front of the target paper to acquire the shooting image formed on the target paper includes:

S201, aligning a shooting field of view of the optical lens with the target paper;

S202, capturing a target paper image formed by the target paper in the optical lens in real time; and S203, performing target identification on the target paper image, and performing picture shooting on the target paper image with the presence of the shooting trace to form the shooting image when the presence of a shooting trace in the target paper image is found by means of the target identification.

Figure 3:
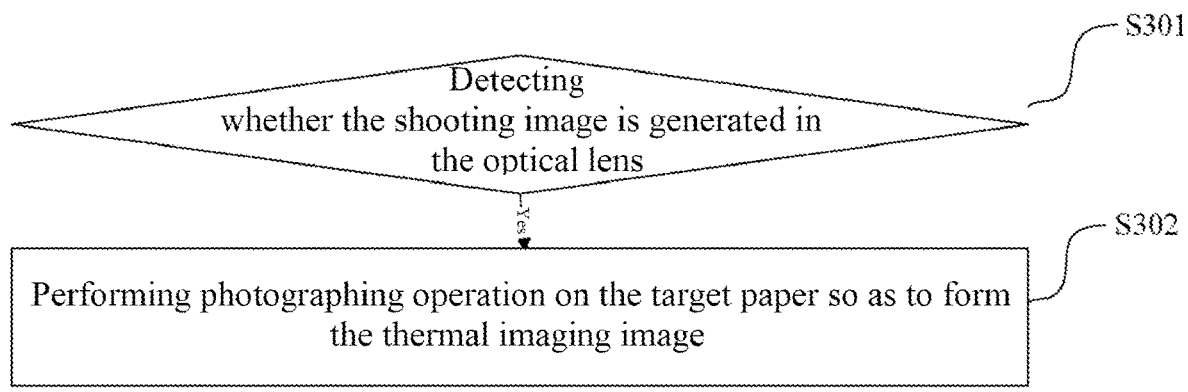
FIG. 3 is a flow chart of another shooting score identifying method provided by an embodiment of the present disclosure.

Referring to FIG. 3, according to a specific implementation mode of the embodiment of the present disclosure, the step that after the shooting image is acquired, a thermal imaging image of the target paper is formed through an infrared lens arranged at the same position as the optical lens includes:

S301, detecting whether the shooting image is generated in the optical lens; and S302, if so, calling the infrared lens to perform photographing operation on the target paper so as to form the thermal imaging image.

Figure 4:
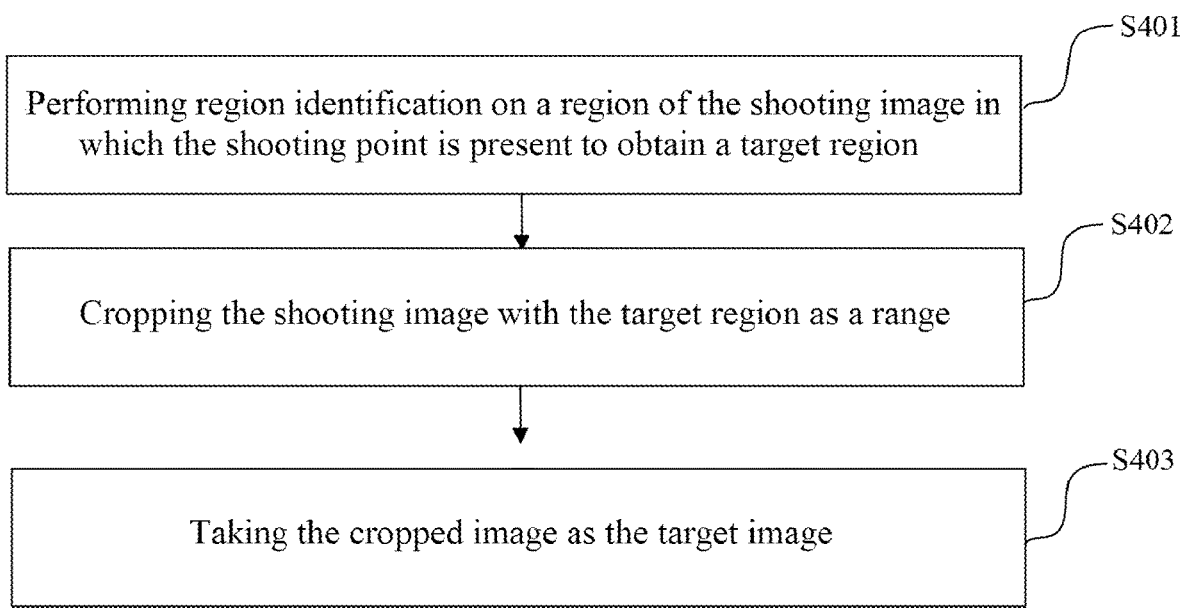
FIG. 4 is a flow chart of another shooting score identifying method provided by an embodiment of the present disclosure.
Figure 5:
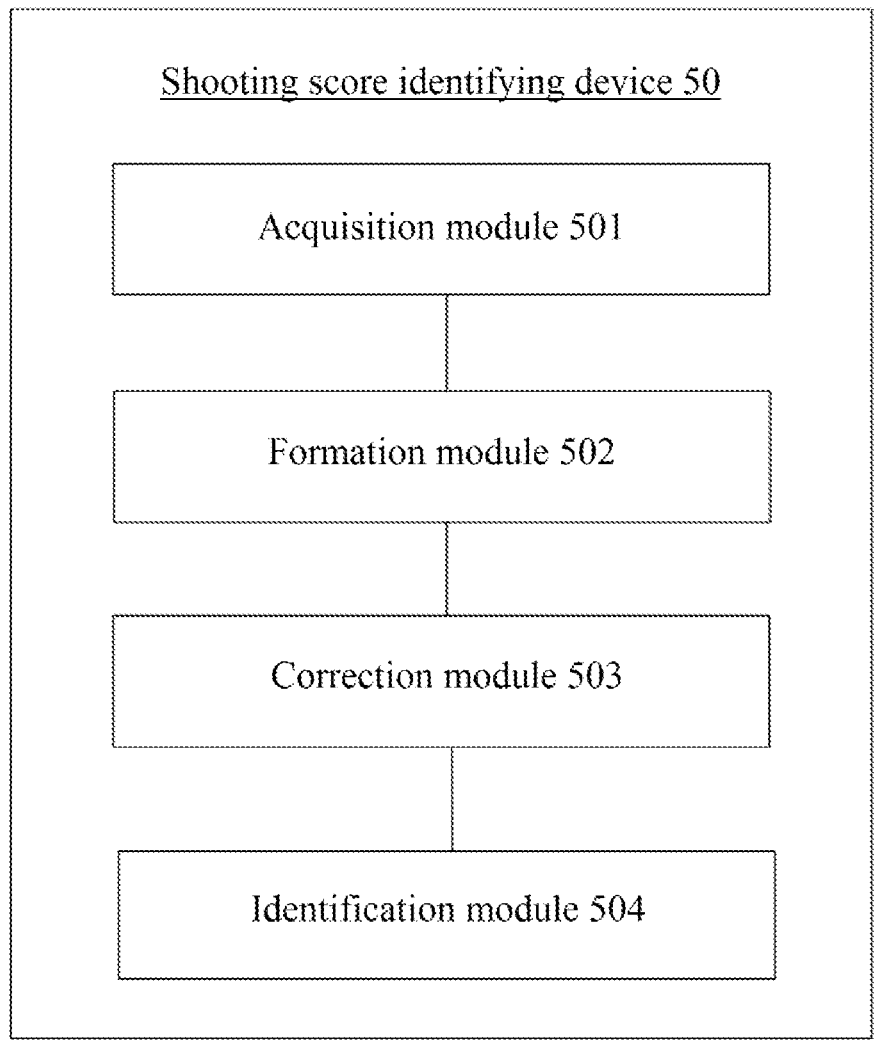
FIG. 5 is a schematic structural diagram of a shooting score identifying device provided by an embodiment of the present disclosure.

Referring to FIG. 4, according to a specific implementation mode of the embodiment of the present disclosure, the step that target identification is performed on the shooting image to obtain the target image related to the shooting point includes:

S401, performing region identification on a region of the shooting image in which the shooting point is present to obtain a target region;

S402, cropping the shooting image with the target region as a range; and

S403, taking the cropped image as the target image.

According to a specific implementation mode of the embodiment of the present disclosure, the step that interference removal processing is performed on the correction image through the thermal imaging image includes: performing an alignment operation on the thermal imaging image and the correction image; performing image filtering processing on the correction image based on an image content formed in the thermal imaging image after the alignment operation is completed.

According to a specific implementation mode of the embodiment of the present disclosure, the step that direction correction is performed on the shooting point present in the target image to obtain the correction image includes: identifying a shooting angle formed by the shooting point in the target image to obtain a shooting direction; judging whether the shooting direction is greater than a preset angle; and if so, performing direction correction on the shooting point.

According to a specific implementation mode of the embodiment of the present disclosure, the target paper includes a bottom layer, a middle layer and a surface layer; the bottom layer includes a solid raw material (e.g., calcium oxide/quicklime+red phosphorus powder+flame-retardant powder), the middle layer includes a water film layer, and the surface layer is provided with target ring information, positioning information and a target paper identification code. In this way, "hitting" smoke is produced by a process of generation of heat by local friction caused by penetration of the surface layer by a bullet-penetration of the water film layer-penetration of the raw material layer-chemical reaction of water and a raw material-locally rapid heat generation, thereby having better visual perception, and higher identification precision and speed.

Corresponding to the above method embodiments, an embodiment of the present disclosure further provides a shooting score identifying device 50, including:
- an acquisition module 501, used for capturing a picture of a shooting operation on target paper through an optical lens arranged in front of the target paper to acquire a shooting image formed on the target paper;
- a formation module 502, used for forming a thermal imaging image of the target paper through an infrared lens arranged at the same position as the optical lens after the shooting image is acquired;
- a correction module 503, used for performing target identification on the shooting image to obtain a target image related to a shooting point, and performing direction correction on the shooting point present in the target image to obtain a correction image; and
- an identification module 504, used for performing interference removal processing on the correction image through the thermal imaging image to obtain an identification image so as to identify the shooting score based on the identification image.

The part which is not described in detail in the embodiment can refer to the content described in the method embodiments, and will not be described here.

Figure 6:
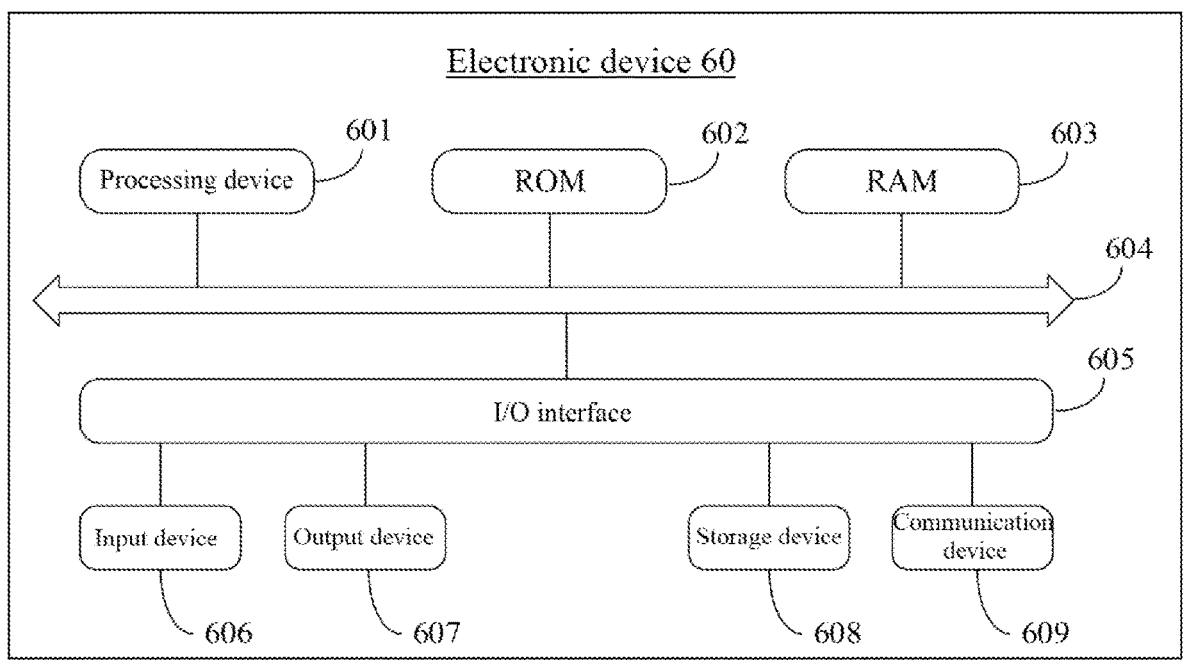
FIG. 6 is a schematic diagram of an electronic device provided by an embodiment of the present disclosure.

Referring to FIG. 6, an embodiment of the present disclosure also provides an electronic device 60, including:
- at least one processor; and
- a memory in communication connection with the at least one processor; wherein The memory stores an instruction which can be executed by the at least one processor, and the instruction is executed by the at least one processor, so that the at least one processor can execute the shooting score identifying method in the above method embodiment.

An embodiment of the present disclosure further provides a non-transient computer readable storage medium, wherein the non-transient computer readable storage medium stores computer instructions which are used for enabling a computer to execute the shooting score identifying method in the above method embodiment.

An embodiment of the present disclosure also provides a computer program product that includes a computer program stored on a non-transient computer readable storage medium, wherein the computer program includes program instructions that, when executed by a computer, enable the computer to execute the shooting score identifying method in the above method embodiment.

Referring to FIG. 6, FIG. 6 shows a schematic structural diagram of an electronic device provided by an embodiment of the present disclosure. The electronic device in the embodiment of the present disclosure includes but is not limited to mobile terminals such as a mobile phone, a notebook computer, a digital broadcast receiver, a PDA (Personal Digital Assistant), a PAD (Tablet Personal Computer), a PMP (Portable Multimedia Player), or a vehicle-mounted terminal (for example, a vehicle-mounted navigation terminal), and fixed terminals such as a digital TV and a desk computer. The electronic device shown in FIG. 6 is only an example, and does not put any limitation on the function and the use range of the embodiments of the present disclosure.

As shown in FIG. 6, an electronic device 60 may include a processing device (e.g., a central processing unit, a graphics processing unit, etc.) 601 that may perform various appropriate actions and processing according to a program stored in a read only memory (ROM) 602 or a program loaded from a storage device 608 into a random access memory (RAM) 603. The RAM 603 also stores various programs and data required for the operation of the electronic device 60. The processing device 601, the ROM 602, and the RAM 603 are connected to each other via a bus 604. An input/output (I/O) interface 605 is also connected to the bus 604.

Generally, the following devices may be connected to the I/O interface 605: an input device 606 including, for example, a touch screen, a touchpad, a keyboard, a mouse, an image sensor, a microphone, an accelerometer, a gyroscope, or the like; an output device 607 including, for example, a liquid crystal display (LCD), a speaker, a vibrator, or the like; a storage device 608 including, for example, a tape, a hard disk, or the like; and a communication device 609. The communication device 609 can allow the electronic device 60 to perform wireless or wired communication with other devices to exchange data, so that scores (results or images) are transmitted to a mobile device of a shooter or a large screen in a wireless transmission manner to be displayed and subjected to voice broadcasting, and can also be transmitted to a corresponding storage device to be recorded for storage; the storage device includes but is not limited to a storage device in the mobile device of the shooter, a storage device associated with each display screen, a cloud storage device and the aforesaid storage devices such as the tape and the hard disk. Although the electronic device 60 with various devices is shown in the figure, it should be understood that it is not required to implement or possess all the devices shown. Alternatively, more or fewer devices may be implemented or provided.

Particularly, according to the embodiment of the present disclosure, the process described by referring to the flow chart can be implemented as a computer software program. For example, an embodiment of the present disclosure includes a computer program product, including a computer program carried on a computer readable medium, wherein the computer program contains program codes for executing the method shown by the flow chart. In such an embodiment, the computer program may be downloaded and installed from the network through the communication device 609, or installed from the storage device 608, or installed from the ROM 602. When the computer program is executed by the processing device 601, the above functions defined in the method of the embodiment of the present disclosure are executed.

It should be noted that the above computer readable medium of the present disclosure can be a computer readable signal medium or a computer readable storage medium or any combination of the computer readable signal medium and the computer readable storage medium. The computer readable storage medium may include—but is not limited to—for example, an electrical, magnetic, optical, electromagnetic, infrared, or semiconductor system, device or apparatus, or a combination of the above system, device and apparatus. More specific examples of the computer readable storage medium may include, but are not limited to: an electrical connector having one or more wires, a portable computer disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any appropriate combination thereof. In the present disclosure, the computer readable storage medium may be any tangible medium containing or storing a program that may be used by or in combination with an instruction execution system, device or apparatus. However, in the present disclosure, the computer readable signal medium may include a data signal that propagates in a baseband or as part of carrier waves, and carried with the computer readable program code. This propagating data signal may be in a variety of forms, including but not limited to an electromagnetic signal, an optical signal, or any appropriate combination thereof. The computer readable signal medium may also be any computer readable medium other than the computer readable storage medium, and may send, propagate, or transmit a program that is used by or in conjunction with an instruction execution system, device or apparatus. A program code contained on the computer readable medium can be transmitted by using any appropriate medium including but not limited to: wires, optical cables, RF (Radio Frequency), etc., or any appropriate combination thereof.

The above computer readable medium may be included in the above electronic device, or may also exist independently, but is not assembled in the electronic device.

The computer readable medium carries one or more programs, and when the one or more programs are executed by the electronic device, the electronic device is caused to: obtain at least two internet protocol addresses; send a node evaluation request including the at least two internet protocol addresses to a node evaluation device which selects an internet protocol address from the at least two internet protocol addresses and returns the internet protocol address; and receive the internet protocol address returned by the node evaluation device, wherein the acquired internet protocol address indicates edge nodes in a content distribution network.

Alternatively, the above computer readable medium carries one or more programs, and when the one or more programs are executed by the electronic device, the electronic device is caused to: receive a node evaluation request including at least two internet protocol addresses; select an internet protocol address from the at least two internet protocol addresses; and return the selected internet protocol address, wherein the received internet protocol address indicates edge nodes in a content distribution network.

Computer program codes for performing the operations of the present disclosure may be compiled in one or more programming languages, or combinations thereof, the above programming languages include object-oriented programming languages, such as Java, Smalltalk, or C++, and also include conventional procedural programming languages, such as "C" language or similar programming languages. The program codes may be executed entirely on a user computer, in part on the user computer, as a separate software package, in part on the user computer and in part on a remote computer, or entirely on a remote computer or a server. In cases that a remote computer is involved, the remote computer may be connected to a user computer via any kind of networks, including a local area network (LAN) or a wide area network (WAN), or may be connected to an external computer (e.g., using the internet by an internet service provider).

Flow charts and block diagrams in the drawings illustrate possible system architectures, functions, and operations, which may be probably realized according to the systems, methods, and computer program products in various embodiments of the present disclosure. In this regard, each block in the flow charts or block diagrams may represent a part of a module, program segment, or codes, and the part of the module, program segment, or codes contain one or more executable instructions for implementing prescribed logical functions. It should be noted that, in some alternative implementations, the functions marked in the square block can also occur in a different order from the sequence marked in the drawings. For example, two square blocks represented in succession can actually be executed substantially in parallel, and sometimes can also be executed in an opposite order, which depends on the functions involved. It also should be noted that each square block in the block diagrams and/or the flow charts, and combinations of the square blocks in the block diagrams and/or the flow charts, may be implemented with a dedicated hardware-based system that performs a prescribed function or operation, or may be implemented with a combination of dedicated hardware and computer instructions.

Involved units described in the embodiments of the present disclosure can be implemented in a software mode, and also can be implemented in a hardware mode. In some cases, the names of the units do not constitute a limitation of the units themselves, for example, a first acquisition unit may also be described as a unit that acquires at least two internet protocol addresses.

It should be understood that various parts of the present disclosure may be implemented in hardware, software, firmware, or combinations thereof.

The above are only the specific implementation modes of the present disclosure, but the protection scope of the present disclosure is not limited therewith. Any technicians familiar with the technical field can easily conceive change or replacement within the technical range disclosed by the present disclosure, and the change or replacement should be covered within the protection scope of the present disclosure. Therefore, the protection scope of the present disclosure is based on the protection scope of the claims.

The invention claimed is:

1. A shooting score identifying method, comprising:
    Step A, acquiring a shooting image formed on a target paper by capturing a picture of a shooting operation on the target paper through an optical lens arranged in front of the target paper;
    Step B, forming a thermal imaging image of the target paper through an infrared lens arranged at the same position as the optical lens after the shooting image is acquired;
    Step C, performing target identification on the shooting image to obtain a target image related to a shooting point, and performing direction correction on the shooting point present in the target image to obtain a correction image; and Step D, performing interference removal processing on the correction image through the thermal imaging image to obtain an identification image, and identifying a shooting score based on the identification image, wherein Step B comprises:
    detecting whether the shooting image is generated in the optical lens; and
    calling the infrared lens in the case that the shooting image is generated in the optical lens to perform photographing operation on the target paper to form the thermal imaging image.

2. The method according to the claim 1, wherein Step A comprises:
    aligning a shooting field of view of the optical lens with the target paper; and
    capturing a target paper image formed by the target paper in the optical lens in real time.

3. The method according to claim 1, wherein performing target identification on the shooting image to obtain the target image related to the shooting point in Step C comprises:
    performing region identification on a region of the shooting image in which the shooting point is present to obtain a target region;
    cropping the shooting image with the target region as a range; and
    taking the cropped image as the target image.

4. The method according to claim 1, wherein performing interference removal processing on the correction image through the thermal imaging image in Step D comprises:
    performing an alignment operation on the thermal imaging image and the correction image; and
    performing image filtering processing on the correction image based on an image content formed in the thermal imaging image after the alignment operation is completed.

5. The method according to claim 1, wherein performing direction correction on the shooting point present in the target image to obtain the correction image in Step C comprises:
    identifying a shooting angle formed by the shooting point in the target image to obtain a shooting direction;
    judging whether the shooting direction is greater than a preset angle; and
    performing direction correction on the shooting point in the case that the shooting direction is greater than the preset angle.

6. The method according to claim 1, wherein performing direction correction on the shooting point present in the target image in Step C comprises:
    selecting a plurality of reference points in the target paper in advance, and performing image acquisition on the target paper by adopting a standard optical lens according to a standard distance and a standard angle to obtain coordinates of the reference points in a standard image as standard reference point coordinates;
    determining offset reference point coordinates between reference point coordinates and the standard reference point coordinates in a to-be-corrected target image by pixel scanning;
    calculating a space coordinate transformation coefficient between standard image and the to-be-corrected target image according to the offset reference point coordinates; and
    performing transformation on all or part of pixels in the to-be-corrected target image according to the space coordinate transformation coefficient to realize correction.

7. An electronic device, comprising:
    at least one processor; and
    a memory in communication connection with the at least one processor, wherein the memory stores instructions executable by the at least one processor to execute the shooting score identifying method of claim 1.

8. A non-transient computer readable storage medium, wherein the non-transient computer readable storage medium stores computer instructions which enables a computer to execute the shooting score identifying method of claim 1.

9. A shooting score identifying method, comprising:
    Step A, acquiring a shooting image formed on a target paper by capturing a picture of a shooting operation on the target paper through an optical lens arranged in front of the target paper;
    Step B, forming a thermal imaging image of the target paper through an infrared lens arranged at the same position as the optical lens after the shooting image is acquired;
    Step C, performing target identification on the shooting image to obtain a target image related to a shooting point, and performing direction correction on the shooting point present in the target image to obtain a correction image; and
    Step D, performing interference removal processing on the correction image through the thermal imaging image to obtain an identification image, and identifying a shooting score based on the identification image,
    wherein:
        the target paper comprises a bottom layer, a middle layer and a surface layer; and
        the bottom layer comprises a solid raw material, the middle layer comprises a water film layer, and the surface layer is provided with target ring information, positioning information and a target paper identification code.

10. A shooting score identifying method, comprising:
    Step A, acquiring a shooting image formed on a target paper by capturing a picture of a shooting operation on the target paper through an optical lens arranged in front of the target paper;
    Step B, forming a thermal imaging image of the target paper through an infrared lens arranged at the same position as the optical lens after the shooting image is acquired;
    Step C, performing target identification on the shooting image to obtain a target image related to a shooting point, and performing direction correction on the shooting point present in the target image to obtain a correction image; and
    Step D, performing interference removal processing on the correction image through the thermal imaging image to obtain an identification image, and identifying a shooting score based on the identification image,
    wherein identifying the shooting score based on the identification image in Step D comprises:
        extracting bullet hole information by using a ternary image to detect the bullet hole center;
        extracting center coordinates of a highest score region in the target paper; and calculating a shooting score according to a position relationship between the bullet hole information and the center coordinates.

11. The method according to claim 10, wherein extracting the bullet hole information by using the ternary image comprises: performing double opening operations on the ternary image to remove interference, and then obtaining a coordinate value of a bullet hole center by using a method of calculating the center of gravity of an object.

12. The method according to claim 10, wherein extracting coordinates of a center point of each score region comprises:
   S1, performing opening operation and closing operation on the image to obtain a binary target surface image;
   S2, performing region marking on the binary target surface image to obtain a highest score region;
   S3, performing edge detection on the highest score region to obtain region edge data; and
   S4, calculating to obtain center coordinates of the region according to the region edge data.

13. The method according to claim 12, wherein step S2 comprises:
   performing region marking by adopting a connected region method to obtain a plurality of marked connected regions; and
   counting areas of the plurality of marked connected regions in a form of pixel number, wherein a plurality of connected regions with the minimum number of pixels are the highest score regions of the target paper.

* * * * *